US007260468B2

(12) United States Patent
Durand et al.

(10) Patent No.: US 7,260,468 B2
(45) Date of Patent: Aug. 21, 2007

(54) CONTROL STRATEGY FOR AN INTERNAL COMBUSTION ENGINE

(75) Inventors: James C Durand, Dunlap, IL (US); Neil A Terry, Chillicothe, IL (US); Gregory W. Tomlins, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/192,955

(22) Filed: Jul. 29, 2005

(65) Prior Publication Data

US 2007/0027608 A1 Feb. 1, 2007

(51) Int. Cl.
*G06F 17/00* (2006.01)
*F01P 7/02* (2006.01)
*F02M 25/07* (2006.01)

(52) U.S. Cl. ...................... 701/101; 701/108; 701/113; 123/41.01; 123/41.12; 123/41.31; 123/568.12

(58) Field of Classification Search .... 123/41.08–41.1, 123/568.12, 41.11, 41.12, 41.31, 41.01; 701/108, 701/101–103, 112, 113; 700/278, 299; 165/279, 165/280
See application file for complete search history.

(56) References Cited

U.S. PATENT DOCUMENTS 4,055,158 A * 10/1977 Marsee .................. 123/568.12
4,557,223 A * 12/1985 N Gueyen ............... 123/41.12
5,529,025 A * 6/1996 Ranzinger et al. ......... 123/41.1
6,085,732 A 7/2000 Wang et al.
6,758,037 B2 7/2004 Terada et al.
2004/0103861 A1* 6/2004 Odeskog et al. ......... 123/41.01
2006/0060443 A1* 3/2006 Smith et al. ............... 192/58.4

* cited by examiner

*Primary Examiner*—Willis R. Wolfe, Jr.
(74) *Attorney, Agent, or Firm*—D. Charlton; Finnegan, Henderson, Farabow, Garrett & Dunner

(57) ABSTRACT

In accordance with an embodiment of the present invention, a method of controlling an internal combustion engine system having an internal combustion engine is disclosed. The internal combustion engine includes an engine block defining a plurality of combustion chambers, an intake air system in fluid communication with the combustion chambers and providing intake air thereto, an exhaust gas system in fluid communication with the combustion chambers and carrying exhaust gas therefrom, a cooling system having a cooling fluid circulated therein and a recirculated gas system in fluid communication with the exhaust gas system and intake air system wherein a portion of the exhaust gas is routed from the exhaust gas system to the intake air system. The method includes sensing at least two internal combustion engine system operating parameters, inputting sensed operating parameters into a controller, storing at least one predetermined constant in the controller, determining a cooling fluid heat threshold using predetermined logic with the controller in response to the at least two internal combustion engine operating parameters and the at least one predetermined constant, and controlling the internal combustion engine system in a predetermined manner in response to reaching the cooling fluid heat threshold.

30 Claims, 2 Drawing Sheets

100

CONTROL STRATEGY FOR AN INTERNAL COMBUSTION ENGINE

TECHNICAL FIELD

This invention relates generally to controlling an internal combustion engine, and, more particularly, to a control strategy that prevents a cooling fluid circulated through a heat exchanger from exceeding a predetermined heat threshold.

BACKGROUND

Typically an internal combustion engine (ICE) has an intake system, exhaust system and cooling system. The ICE may further include a recirculated air system that is controlled by logic, in response to certain engine parameters, so that under predetermined ICE operating conditions, a valve is opened to allow a predetermined portion of exhaust gas to be introduced into the intake system.

The recirculated air system may include an exhaust gas cooler, which cools the predetermined portion of exhaust gas before it is introduced into the intake system. The exhaust gas cooler acts as a heat exchanger wherein a cooling fluid contained therein impinges the outer wall of the exhaust gas cooler and absorbs heat from the exhaust gas. Then, the cooling fluid is circulated through a separate heat exchanger where the cooling fluid is cooled. The cooling fluids typically used are oil, water, water mixtures or air. Typically, the most common cooling fluid used within the exhaust gas cooler is a water or water mixture that is also used by the cooling system of the ICE.

Under certain ICE operating conditions, the temperature of the exhaust gas may elevate. If the cooling effects of the cooling fluid are insufficient to overcome the elevated temperature of the exhaust gas, the exhaust gas cooler walls may become hot enough to damage the exhaust gas cooler.

It is known in the art to sense various temperatures that impact an exhaust gas cooler for a recirculated air system and determine when such temperatures exceed a predetermined threshold in order to monitor when a fault condition occurs. One such fault diagnostic system is described in U.S. Pat. No. 6,085,732 issued to Wang et al. on Jul. 11, 2000. Wang et al. discloses a system and method of sensing either recirculated air temperatures and/or a cooling liquid temperatures and comparing such values to threshold values in order to determine when a fault condition occurs that could damage an exhaust gas heat exchanger or cooler. However, Wang et al. fails to teach being able to prevent the fault condition from occurring, thereby limiting the ability to control the system in a proactive manner that ensures that the exhaust gas cooler is not damaged.

The present invention is directed to overcoming one or more of the problems as set forth above.

SUMMARY OF THE INVENTION

In accordance with an embodiment of the present invention, an internal combustion engine is disclosed. The internal combustion engine system includes an internal combustion engine having an engine block defining a plurality of combustion chambers, an intake air system in fluid communication with the combustion chambers providing intake air thereto, an exhaust gas system in fluid communication with the combustion chambers carrying exhaust gas therefrom, and a cooling system fluidly connected to the internal combustion engine and having a cooling fluid circulated therein. The internal combustion engine system further includes a recirculated gas system in fluid communication with the exhaust gas system and intake air system, wherein a portion of the exhaust gas is routed from the exhaust gas system to the intake air system. The recirculated gas system includes a heat exchanger fluidly connected with the cooling system. The internal combustion engine further includes a controller operatively connected to the internal combustion engine system that is adapted for receiving input signals, sending output signals, storing predetermined constants and storing predetermined logic. The predetermined logic being capable of determining a cooling fluid heat threshold in response to at least two input signals and at least one predetermined constant.

In accordance with another embodiment of the present invention, a method of controlling an internal combustion engine system having an internal combustion engine is disclosed. The internal combustion engine includes an engine block defining a plurality of combustion chambers, an intake air system in fluid communication with the combustion chambers providing intake air thereto, an exhaust gas system in fluid communication with the combustion chambers carrying exhaust gas therefrom, a cooling system fluidly connected to the engine block having a cooling fluid circulated therein and a recirculated gas system in fluid communication with the exhaust gas system and intake air system, wherein a portion of the exhaust gas is routed from the exhaust gas system to the intake air system. The recirculated gas system includes a heat exchanger fluidly connected to the cooling system. The method includes sensing at least two internal combustion engine system operating parameters, inputting sensed operating parameters into a controller, storing at least one predetermined constant in the controller, determining a cooling fluid heat threshold in response to the at least two internal combustion engine operating parameters and the at least one predetermined constant, and controlling the internal combustion engine system using predetermined logic with the controller in response to reaching the cooling fluid heat threshold.

In accordance with yet another embodiment of the present invention, a control system for a device producing a heated fluid is disclosed. The device has a heat exchanger with a cooling fluid circulated therein for cooling the heated fluid. The control system includes a controller operatively connected with the device and adapted for receiving input signals, sending output signals, storing predetermined constants and predetermined logic, the predetermined logic being capable of determining a cooling fluid heat threshold in response to at least two input signals and at least one predetermined constant.

In yet another embodiment of the present invention, a method of controlling a device that produces a heated fluid is disclosed. The device has a heat exchanger with a cooling fluid circulated therein for cooling the heated fluid.

The method comprises the steps of sensing at least two operating conditions of the device, inputting sensed operating conditions into a controller, storing at least one predetermined constant in the controller, determining a cooling fluid heat threshold in response to the at least two operating conditions of the device and the at least one predetermined constant and controlling the device using predetermined logic with the controller in response to reaching the cooling fluid heat threshold.

It is to be understood that both the foregoing and general description and the following detailed description are exemplary and explanatory only and are not restrictive of the invention.

DETAILED DESCRIPTION

Figure 1:
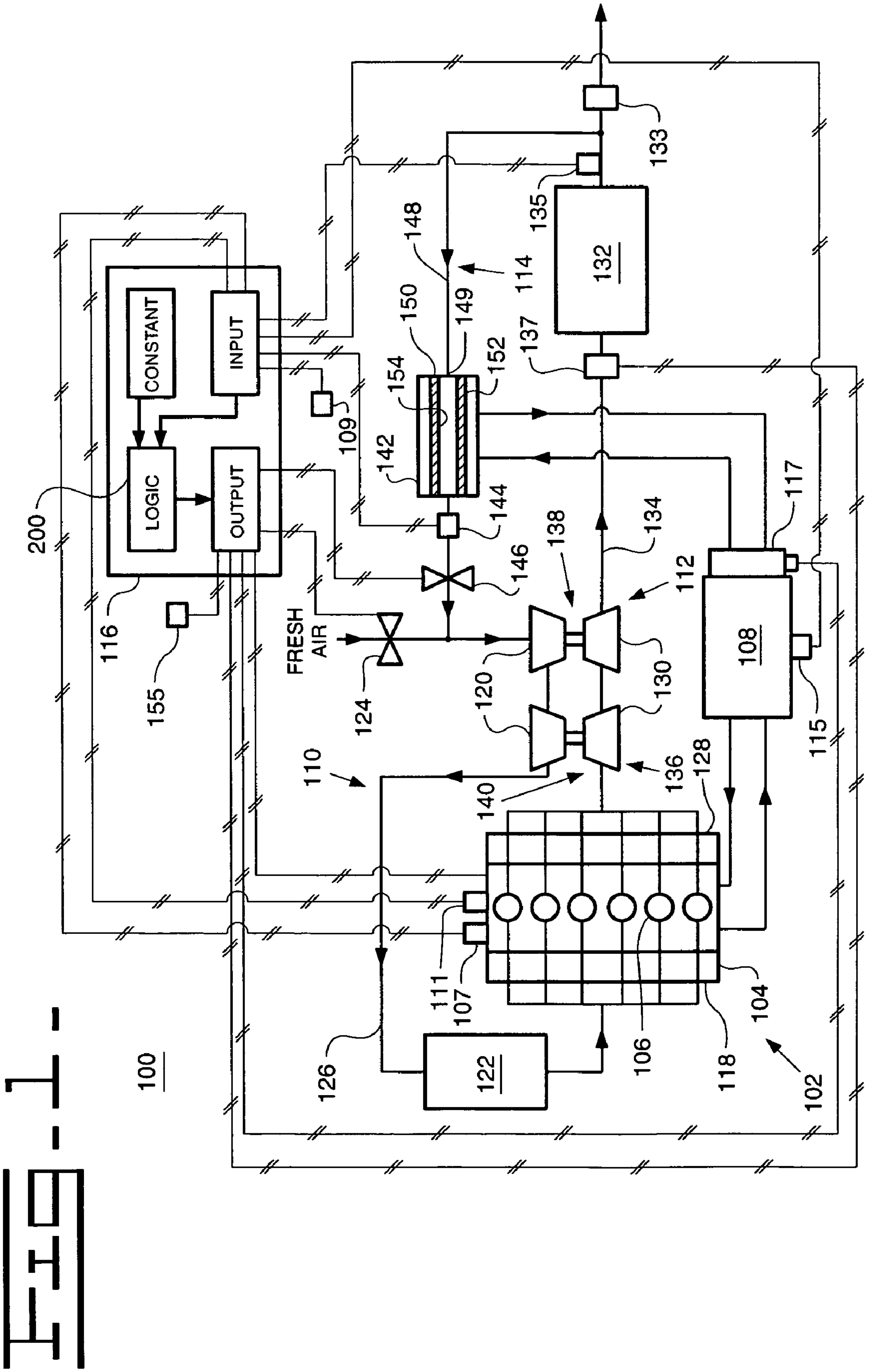
FIG. 1 is a diagrammatic view of an internal combustion engine incorporating an embodiment of the present invention.

Referring to FIG. 1, there is shown a diagrammatic representation of an exemplary internal combustion engine system 100 incorporating an embodiment of the present invention. The internal combustion engine system 100, hereafter known as the ICE system, is that of a four-stroke, diesel engine. The ICE system 100 includes an internal combustion engine 102, hereafter known as the ICE, having an engine block 104 defining a plurality of combustion chambers 106, the number of which depends on the particular application. In the exemplary ICE 102, six combustion chambers 106 are shown, however, it should be appreciated that any number of combustion chambers 106 may be applicable with the present invention. Although not shown, associated with each combustion chamber 106 is: a fuel injector, a cylinder liner, at least one intake air port and corresponding intake valve, at least one exhaust gas port and corresponding exhaust valve, and a reciprocating piston moveable within each cylinder liner to define, in conjunction with the cylinder head, each such combustion chamber 106.

The ICE system 100 may include a plurality of sensors including, but not limited to, ICE speed sensor 107, atmospheric pressure sensor 109 and ICE fuel rate sensor 111, which are capable of outputting a signal indicative of ICE speed, atmospheric pressure and ICE fuel rate, respectively. The location of the plurality of sensors, as shown, is exemplary and the location is a matter of preference and not limited by the present invention.

The illustrated ICE system 100 includes a cooling system 108, an intake air system 110, an exhaust gas system 112, a recirculated gas system 114 and a controller 116.

The cooling system 108 is operatively connected to the ICE 102 and is well known in the art as a cooling liquid system, which includes a fan (not shown), a heat exchanger, also known as a radiator (not shown), a drive pump 117 and a conduit (not shown) for interconnecting the radiator (not shown) to the ICE 102. In the embodiment of the present invention, a cooling liquid is used as a cooling fluid and is a water and glycol mixture, however, it should be appreciated that other mixtures or cooling fluids may be used, such as, oil, water, other water mixtures or air. It should be appreciated that the cooling fluid has characteristics, such as, but not limited to, a vaporization or boiling point, a flow rate, a temperature, a pressure and the like. The cooling system 108 may include a cooling fluid temperature sensor 115 in fluid communication with the cooling fluid that is capable of outputting a signal indicative of the cooling fluid temperature and/or pressure. The location of the cooling fluid temperature sensor 115, as shown, is exemplary and the location is a matter of preference and not limited by the present invention. Further, the drive pump 117 may be a variably controlled water pump but any suitable pump or device may be used to circulate the cooling fluid through the cooling system 108.

The intake air system 110 includes an intake manifold 118 removably connectable to the engine block 104 and in fluid communication with the combustion chambers 106. In addition, the intake air system 110 includes one or more intake air compressors 120, an intercooler 122 and a throttle valve 124, all fluidly coupled by an intake air conduit 126. The intake air compressors 120 could be, but not limited to, a traditional turbocharger known in the art, an electric turbocharger, a supercharger and the like. Although two intake air compressors 120 are shown, it should be appreciated that the number of intake air compressors 120 is a matter of choice and not limited by the present invention.

The exhaust gas system 112 includes an exhaust manifold 128 removably connectable to the engine block 104 and in fluid communication with the combustion chambers 106, an intake air compressor drive 130 and a particulate matter filter 132, all fluidly coupled by an exhaust gas conduit 134. The exhaust manifold 128 is shown as a single-part construction for simplicity, however, it should be appreciated that the exhaust manifold 128 may be constructed as multipart or split manifolds, depending upon the particular application. Exhaust gas generated from the ICE 102 flows through the exhaust gas system 112 and possesses characteristics, such as, but not limited to, a flow rate, a temperature and the like. Further, the exhaust gas system 112 includes a means 135 for sensing the exhaust temperature, such as an exhaust gas temperature sensor, in fluid communication with the exhaust gas and capable of outputting a signal indicative of the exhaust gas temperature and/or pressure. In the embodiment shown, the sensing means 135 is an exhaust gas temperature sensor located downstream of the particulate matter filter 132, however, it should be appreciated that the location of the exhaust gas temperature sensor 135 could be upstream or within the particulate matter filter 132 and, therefore, is contemplated in the present invention. Further, the exhaust gas system 112 includes an oxidation catalyst 133 downstream of the particulate matter filter 132. Again, it should be appreciated that the location of the oxidation catalyst 133 could be upstream of the particulate matter filter 132 or excluded from the exhaust gas system 112 without deviating from the scope of the present invention.

A regeneration management system, such as an auxiliary regeneration device 137 is included in the exhaust gas system 112, in communication with the particulate matter filter 132. The auxiliary regeneration device 137 may be electrical, chemical, gaseous or other suitable type. It is understood, however, that other regeneration management systems may be used, as well, including, but not limited to, dosing, thermal management, passive regeneration or any suitable system.

The intake air compressors 120 and air compressor drive 130 are illustrated as part of a turbocharger system 136. The turbocharger system 136 shown is a first turbocharger 138 and may include a second turbocharger 140. The first and second turbochargers 138,140 may be arranged in series such that the first turbocharger 138 provides a first stage of pressurization and the second turbocharger 140 provides a second stage of pressurization.

The recirculated gas system 114 shown is typical of a low-pressure recirculated gas system for an ICE system 100, however, it should be appreciated that other types of recirculated gas systems 114 may be applicable, such as, but not limited to, high-pressure or moderate-pressure systems or combinations thereof. The recirculated gas system 114 includes a heat exchanger, also known as an exhaust gas cooler 142, a recirculated gas sensor 144 and a recirculated gas valve 146 all fluidly coupled by a recirculated gas conduit 148. The recirculated gas sensor 144 is capable of outputting a signal indicative of the recirculated gas temperature and/or pressure. In the embodiment of the present invention, the recirculated gas sensor 144 is a mass air flow sensor well known in the art.

In the embodiment shown, the exhaust gas cooler 142 is fluidly connected to the cooling system 108 and has a cooling fluid therein that is shared with the cooling system 108. Although the exhaust gas cooler 142 is shown fluidly connected to the cooling system 108, it should be obvious that the exhaust gas cooler 142 may be independent from the cooling system 108 without deviating from the present invention. In such case, any inputs related to the cooling system 108 and described herein would be similarly applicable to the exhaust gas cooler 142. Further, in such case, it should be understood that other mixtures or cooling fluids might be used within the exhaust gas cooler 142, such as, oil, water, other water mixtures or air. The exhaust gas cooler 142 is structured to have a cooler inlet 149 and a cooler wall 150 with an outer surface 152 where cooling fluid impinges and an inner surface 154 where recirculated exhaust gas impinges.

The controller 116 is operatively coupled with the ICE system 100 and is capable of receiving sensor input signals, outputting signals, storing predetermined data and storing predetermined logic.

The controller 116, in the embodiment shown, receives sensor input signals from one or more of the atmospheric pressure sensors 109, the cooling fluid temperature sensor 115, ICE speed sensor 107, ICE fuel rate sensor 111, exhaust gas temperature sensor 135 and recirculated gas temperature sensor 144. However, it should be appreciated that the controller 116 may receive sensor inputs from any other sensors that sense characteristics within the ICE system 100, which include, but are not limited to, sensors internal or external to such ICE system 100.

The controller 116, in the embodiment shown, outputs signals to one or more of the ICE 102, throttle valve 124, recirculated gas valve 146, auxiliary regeneration device 137, drive pump 117 and/or operator alert device 155. However, it should be appreciated that the controller 116 is not limited to these outputs and may output signals dependent upon the desired application or intended result. The controller 116 includes at least one predetermined control strategy (not shown) in communication with controller output signals.

The controller 116, in the embodiment shown, stores predetermined data such as constants for the ICE system 100 and exhaust gas cooler 142. The constants for the ICE system 100 may include, but are not limited to, ICE speed, ICE fuel rate, cooling fluid pressure, cooling fluid heat threshold temperature, density of the cooling fluid, cooling fluid type, cooling fluid volume flow through the exhaust gas cooler 142, specific heat of the exhaust gas, and temperature change in the recirculated gas conduit 148. The constants for the exhaust gas cooler 142 may include, but are not limited to, at least one heat transfer map and at least one heat threshold map.

The controller 116, in the embodiment shown, stores predetermined logic, such as the at least one predetermined control strategy (not shown) and logic 200 that determines a cooling fluid heat threshold in response to one or more inputs and predetermined stored data. In combination with the at least one predetermined control strategy (not shown), the controller 116 outputs signals to the ICE system 100 in response to determining when cooling fluid heat threshold has been reached.

Figure 2:
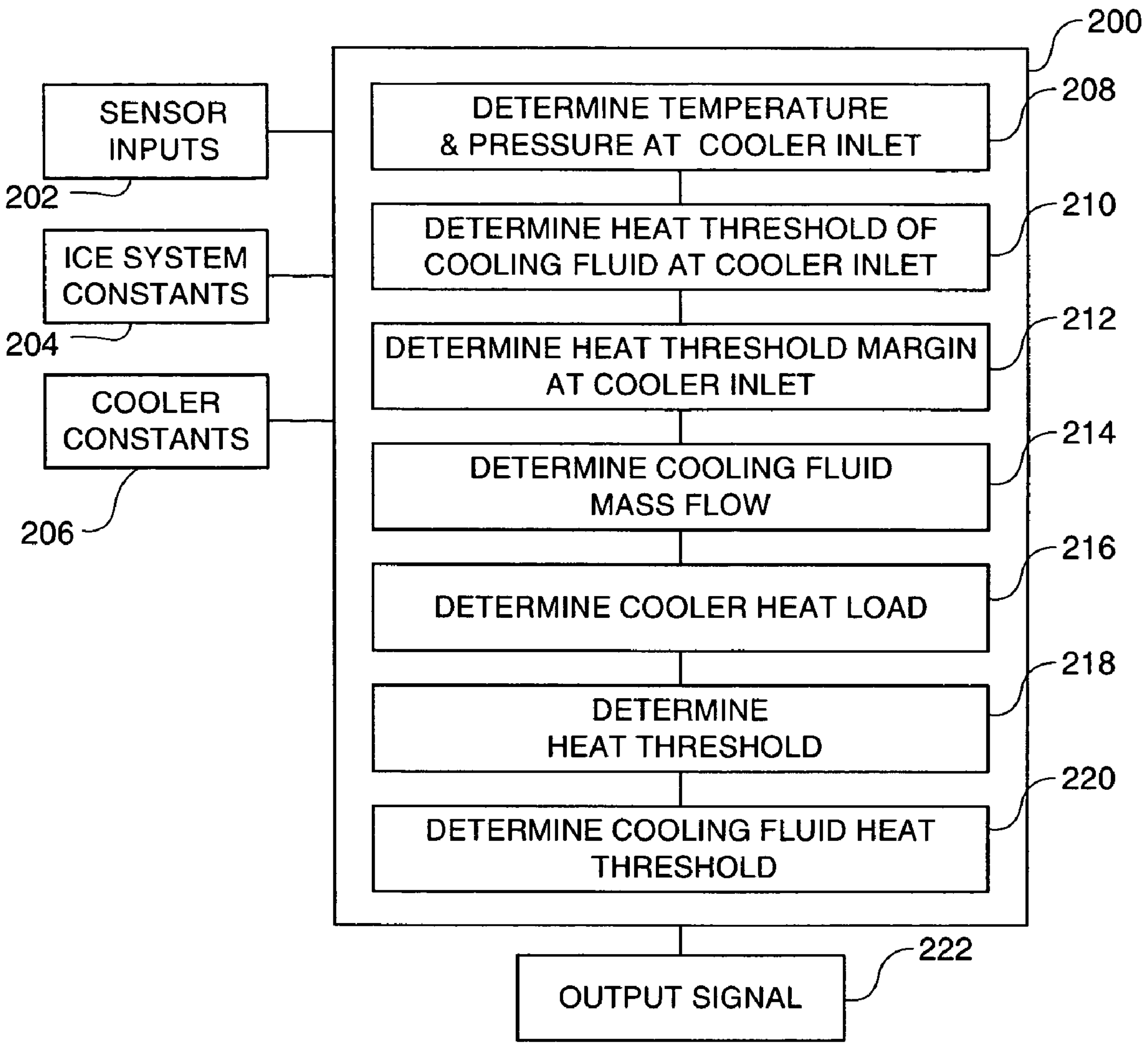
FIG. 2 is a flowchart showing logic for the embodiment of the present invention.

Referring to FIG. 2, the cooling fluid heat threshold logic 200 will be discussed in further detail. Blocks 202, 204 and 206 input data into the cooling fluid heat threshold logic 200. The cooling fluid heat threshold logic 200 calculates the cooling fluid heat threshold in blocks 208 through 220. The cooling fluid heat threshold logic 200 then sends at least one output signal to the ICE system 100, represented by block 222 dependent on the, at least one predetermined control strategy (not shown).

INDUSTRIAL APPLICABILITY

In typical operating conditions of the exemplary ICE system 100, air enters the intake air system 110 and is compressed by the turbocharger system 136. After passing through the intercooler 122, the compressed intake air enters the combustion chambers 106 via the intake manifold 118 and the intake port (not shown). The compressed intake air combusts, resulting in exhaust gas, which then exits the combustion chambers 106 via the exhaust port (not shown) and the exhaust manifold 128. The exhaust gas exits the ICE system 100 via the turbocharger system 136, passing through the particulate matter filter 132.

Under predetermined operating conditions, and, in response to at least one operating parameter of the ICE system 100, a portion of the exhaust gas is routed through the recirculated gas system 114 and into the intake air system 110, via the recirculated gas valve 146, which is controlled by the controller 116 in response to the at least one operating parameter.

The recirculated exhaust gas flowing through the exhaust gas cooler 142 impinges on the inner surface 154 resulting in a heating effect on the cooler wall 150. In addition, cooling fluid from the cooling system 108 impinges on the outer surface 152 of the cooler wall 150 and the cooling fluid has a cooling effect on the cooler wall 150. The cooling fluid heat threshold logic 200 determines when the cooling fluid heat threshold has been reached. The cooling fluid heat threshold is a peak temperature or temperature range of the cooling fluid that allows the temperature of the cooler wall 150 to remain below a point where the exhaust gas cooler 142 is damaged. In the embodiment shown, the targeted cooling fluid heat threshold is a temperature or temperature range near the boiling point of the water and glycol mixture. However, it should be understood that the cooling fluid heat threshold is determined by the particular cooling fluid used within the exhaust gas cooler 142. For instance, if the cooling fluid within the exhaust gas cooler 142 were air, then the cooling fluid heat threshold would be different than for the water and glycol mixture. Therefore, it should be appreciated that the cooling fluid heat threshold is a peak temperature or temperature range for the particular cooling fluid wherein the exhaust gas cooler 142 is not damaged by excessive heat.

Referring to the cooling fluid heat threshold logic 200 in FIG. 2, the cooling fluid heat threshold logic 200 receives sensor inputs 202, ICE system constants 204 and cooler constants 206 which will be used to determine the cooling fluid heat threshold. Initially, the cooling fluid heat threshold logic 200 determines the cooling fluid temperature and the cooling fluid pressure at cooler inlet 149, at block 208. In the embodiment of the present invention, the cooling fluid temperature at cooler inlet 149 is determined by inputs from the cooling fluid temperature sensor 115, cooling fluid type constant, ICE fuel rate sensor 111, ICE speed sensor 107, ICE fuel rate constant and ICE speed constant. The cooling fluid pressure at cooler inlet 149 is determined by inputs from the atmospheric pressure sensor 109, cooling fluid pressure constant, ICE speed sensor 107 and ICE speed constant.

Next, the heat threshold of the cooling fluid at the cooler inlet 149 is determined at block 210. In the embodiment of the present invention, the heat threshold of the cooling fluid at the cooler inlet 149 is determined by inputs from the cooling fluid pressure at cooler inlet 149, calculated in block 208, and cooling fluid threshold temperature constant.

Then, block 212 determines the heat threshold margin at the cooler inlet 149. In the embodiment of the present invention, the heat threshold margin at the cooler inlet 149 is determined by inputs from the heat threshold of the cooling fluid at the cooler inlet 149, calculated in block 210, and the cooling fluid temperature at cooler inlet 149, calculated in block 208.

It should be understood that although the cooler inlet 149 is designated in FIG. 2 as a specific location, the components or sensors used for sensing the conditions or parameters in blocks 208, 210 and 212 at such cooler inlet 149 may be at positioned at various locations throughout the ICE system 100 so long as there is a corresponding or extrapolated relationship with the conditions or parameters at the cooler inlet 149.

Next, block 214 determines the cooling fluid mass flow. In the embodiment of the present invention, the cooling fluid mass flow is determined by inputs from the density of the cooling fluid constant and cooling fluid temperature at cooler inlet 149, calculated in block 208. Then, the cooling fluid mass flow is determined by inputs from the density of the cooling fluid constant, ICE speed sensor 107, ICE speed constant and the cooling fluid volume flow through the cooler constant.

Then, block 216 determines the cooler heat load. In the embodiment of the present invention, the cooler heat load is determined by inputs from the exhaust gas temperature sensor 135 and the recirculated gas temperature sensor 144.

Next, block 218 determines the heat threshold. In the embodiment of the present invention, the heat threshold is determined by inputs from the cooler heat load, calculated in block 216, at least one heat threshold map constant and the heat threshold margin at the cooler inlet 149, calculated in block 212.

Then, block 220 determines the cooling fluid heat threshold. In the embodiment of the present invention, the cooling fluid heat threshold is determined by inputs from the heat threshold, calculated in block 218, and the cooling fluid mass flow, calculated in block 214.

Finally, the cooling fluid heat threshold logic 200 communicates that the cooling fluid heat threshold has been reached to the at least one predetermined control strategy, which, in turn, outputs signals to one or more of the ICE 102, throttle valve 124, recirculated gas valve 146, auxiliary regeneration device 137 and drive pump 117 in order to control the respective operating parameters of the ICE system 100. The ability to control various operating parameters within the ICE system 100 ensures that the cooling fluid will not exceed the cooling fluid heat threshold. Further, it is anticipated that in the embodiment of the present invention, the at least one predetermined control strategy may also provide an output signal to the operator alert device 155 in order to alert an operator of an event occurring with the ICE 102, throttle valve 124, recirculated gas valve 146, auxiliary regeneration device 137 and drive pump 117 and/or the condition of the exhaust gas cooler 142.

It should be appreciated that other logic means may be used for determining the cooling fluid heat threshold without deviating from the present invention. Also, it should be appreciated that although the present invention is described for use within a recirculated gas system 114 for an ICE system 100, any heat exchanger for an ICE system having at least one cooling fluid circulated therein and one heated fluid circulated for cooling therethrough is contemplated within the scope of the present invention. Further, it should be appreciated that although the present invention is described for use with an ICE system 100, any system or device that produces a heated fluid, such as, but not limited to, a furnace, a heat pump and the like, and that also utilizes a heat exchanger for cooling such heated fluid is contemplated within the scope of the present invention. It should be appreciated that if a heat exchanger is used that is not within a recirculated gas system, the inputs signals and predetermined constants for the determination of the cooling fluid heat threshold may be related to the cooling fluid, heated fluid, heat exchanger, system or device, components in such system or device and/or other internal or external conditions or parameters impacting the foregoing. Furthermore, it should be appreciated that the control strategy would include controlling at least one operating parameter of the system or device. In such case, the output signals from the controller would vary dependent on the system or device being used and based on the operating conditions or parameters for such system or device. Therefore, the output signals would be sent to various components within the system or device in order to control the operating parameters in a manner wherein the respective heat exchanger is not damaged by exceeding the cooling fluid heat threshold.

What is claimed is:

1. A method of controlling a device that produces a heated fluid, the device having a heat exchanger with a cooling fluid circulated therein for cooling the heated fluid, the method comprising the steps of:

sensing at least two operating parameters of the device;

inputting sensed operating parameters into a controller;

storing at least one predetermined constant in the controller;

determining a cooling fluid heat threshold using predetermined logic with the controller in response to the at least two operating parameters of the device and the at least one predetermined constant; and controlling the device in a predetermined manner in response to reaching the cooling fluid heat threshold.

2. The method of claim 1, wherein the step of controlling the device in a predetermined manner includes the step of:

controlling at least one operating parameter of the device.

3. A control system for a device producing a heated fluid, the device having a heat exchanger with a cooling fluid circulated therein for cooling the heated fluid, comprising:

a controller operatively connected with the device and adapted for receiving input signals, sending output signals, storing predetermined constants and predetermined logic, the predetermined logic being capable of determining a cooling fluid heat threshold in response to at least two input signals and at least one predetermined constant.

4. The control system of claim 3, wherein the at least two input signals include at least two of a cooling fluid temperature, cooling fluid pressure, atmospheric pressure, a heated fluid temperature, heated fluid pressure and an operating parameter of the device.

5. The control strategy of claim 3, wherein the at least one predetermined constant includes at least one of an operating parameter of the device, cooling fluid pressure, cooling fluid heat threshold temperature, density of the cooling fluid, cooling fluid type, cooling fluid volume flow through the heat exchanger, specific heat of the heated fluid, heat transfer map and heat threshold map.

6. An internal combustion engine system having an internal combustion engine, the internal combustion engine having an engine block defining a plurality of combustion chambers, an intake air system in fluid communication with the combustion chambers and providing intake air thereto, an exhaust gas system in fluid communication with the combustion chambers and carrying exhaust gas therefrom, and a cooling system fluidly connected with the internal combustion engine and having a cooling fluid circulated therein, the internal combustion engine system, comprising:

a recirculated gas system in fluid communication with the intake air system and the exhaust gas system wherein a portion of exhaust gas is routed from the exhaust gas system to the intake air system, the recirculated gas system including a heat exchanger in fluid communication with the cooling system; and a controller operatively connected with the internal combustion engine system and adapted for receiving input signals, sending output signals, and storing predetermined constants and predetermined logic, the predetermined logic being capable of determining a cooling fluid heat threshold in response to at least two input signals and at least one predetermined constant.

7. The internal combustion engine system of claim 6, wherein the at least one predetermined constant includes at least one of an internal combustion engine speed, internal combustion engine fuel rate, cooling fluid pressure, cooling fluid heat threshold temperature, density of the cooling fluid, cooling fluid type, cooling fluid volume flow through the heat exchanger, specific heat of the exhaust gas, temperature change in the recirculated gas conduit, heat transfer map and heat threshold map.

8. The internal combustion engine system of claim 6, wherein the predetermined logic includes at least one control strategy for controlling at least one of the internal combustion engine, intake air system, exhaust gas system, recirculated gas system and cooling system in response to reaching the cooling fluid heat threshold.

9. The internal combustion engine system of claim 8, wherein controlling the recirculated gas system includes controlling a recirculated gas valve, controlling the exhaust gas system includes controlling a regeneration management system, and controlling the cooling system includes controlling a cooling fluid pump.

10. The internal combustion engine system of claim 6, wherein the at least two input signals include at least two of a cooling fluid temperature, cooling fluid pressure, atmospheric pressure, an exhaust gas temperature, a recirculated gas temperature, internal combustion engine fuel rate and internal combustion engine speed.

11. The internal combustion engine system of claim 10, wherein the exhaust gas system includes a sensor being capable of determining the exhaust gas temperature, the sensor being capable of outputting a signal to the controller indicative of the temperature of the exhaust gas.

12. The internal combustion engine system of claim 10, wherein the internal combustion engine system includes a sensor being capable of determining the atmospheric pressure, the sensor being capable of outputting a signal to the controller indicative of the pressure of the atmosphere.

13. The internal combustion engine system of claim 10, wherein the cooling system includes a sensor being capable of determining the cooling fluid temperature, the sensor being capable of outputting a signal to the controller indicative of the temperature of the cooling fluid.

14. The internal combustion engine system of claim 10, wherein the cooling system includes a sensor being capable of determining the cooling fluid pressure, the sensor being capable of outputting a signal to the controller indicative of the pressure of the cooling fluid.

15. The internal combustion engine system of claim 10, wherein the internal combustion engine includes a sensor being capable of determining the internal combustion engine speed, the sensor being capable of outputting a signal to the controller indicative of the internal combustion engine speed.

16. The internal combustion engine system of claim 10, wherein the recirculated gas system includes a sensor being capable of determining the recirculated gas temperature, the sensor being capable of outputting a signal to the controller indicative of the temperature of the recirculated gas.

17. The internal combustion engine system of claim 16, wherein the sensor is a mass air flow sensor.

18. A method of controlling an internal combustion engine system having an internal combustion engine, the internal combustion engine having an engine block defining a plurality of combustion chambers, an intake air system in fluid communication with the combustion chambers and providing intake air thereto, an exhaust gas system in fluid communication with the combustion chambers and carrying exhaust gas therefrom, a cooling system fluidly connected to the engine block and having a cooling fluid circulated therein, and a recirculated gas system in fluid communication with the exhaust gas system and intake air system wherein a portion of the exhaust gas is routed from the exhaust gas system to the intake air system, the recirculated gas system including a heat exchanger in fluid communication with the cooling system, the method comprising the steps of:

sensing at least two internal combustion engine system operating parameters;

inputting sensed operating parameters into a controller;

storing at least one predetermined constant in the controller;

determining a cooling fluid heat threshold using predetermined logic with the controller in response to the at least two internal combustion engine operating parameter and the at least one predetermined constant; and controlling the internal combustion engine system in response reaching the cooling fluid heat threshold.

19. The method of claim 18, wherein the step of determining the cooling fluid heat threshold includes the step of sending a signal to an operator alert device.

20. The method of claim 18, wherein the step of sensing the at least two internal combustion engine system operating parameters includes the step of sensing at least two of a cooling fluid temperature, a cooling fluid pressure, an atmospheric pressure, an exhaust gas temperature, a recirculated gas temperature, an internal combustion engine fuel rate and an internal combustion engine speed.

21. The method of claim 20, wherein the step of storing at least one predetermined constant includes the step of storing at least one of an internal combustion engine speed, internal combustion engine fuel rate, cooling fluid pressure, cooling fluid heat threshold temperature, density of the cooling fluid, cooling fluid type, cooling fluid volume flow through the heat exchanger, specific heat of the exhaust gas, temperature change in the recirculated gas conduit, heat transfer map and heat threshold map.

22. The method of claim 18, wherein the step of controlling the internal combustion engine system includes the step of applying a control strategy for controlling at least one of the internal combustion engine, the cooling system, the intake air system, the exhaust gas system and the recirculated gas system.

23. The method of claim 22, wherein the step of controlling the internal combustion engine system includes the step of controlling at least one of a recirculated gas valve, a regeneration management system, a cooling fluid pump and speed of the internal combustion engine.

24. The method of claim 18, wherein the heat exchanger has an inlet and the step of determining the cooling fluid heat threshold includes the steps of:

determining a cooling fluid temperature and a cooling fluid pressure at the inlet;

determining a heat threshold of the cooling fluid at the inlet;

determining a heat threshold margin at the inlet;

determining a cooling fluid mass flow;

determining a heat exchanger heat load;

determining a heat threshold; and calculating the cooling fluid heat threshold by applying the determined cooling fluid temperature, cooling fluid pressure, heat threshold of the cooling fluid, heat threshold margin, cooling fluid mass flow, heat exchanger heat load, and heat threshold to the predetermined logic.

25. The method of claim 24, wherein the step of determining the heat threshold of the cooling fluid at the inlet includes the step of using the cooling fluid pressure at the inlet and the at least one predetermined constant.

26. The method of claim 25, wherein the step of determining the heat threshold margin at the inlet includes the step of using the heat threshold of the cooling fluid at the inlet and the cooling fluid temperature at the inlet.

27. The method of claim 26, wherein the step of determining the cooling fluid mass flow includes the step of using the cooling fluid temperature at the inlet, the at least two internal combustion engine system operating parameters and the at least one predetermined constant.

28. The method of claim 27, wherein the step of determining the heat exchanger heat load includes the step of using the at least two internal combustion engine system operating parameters.

29. The method of claim 28, wherein the step of determining the heat threshold includes the step of using the heat exchanger heat load, the heat threshold margin at the inlet and the at least one predetermined constant.

30. The method of claim 29, wherein the step of calculating the cooling fluid heat threshold includes the step of using the heat threshold and the cooling fluid mass flow.

* * * * *